(12) United States Patent
Ishii et al.

(10) Patent No.: US 12,432,323 B2
(45) Date of Patent: Sep. 30, 2025

(54) OPTICS FOR PROJECTION DISPLAY

(71) Applicant: Fusao Ishii, Pittsburgh, PA (US)

(72) Inventors: Fusao Ishii, Pittsburgh, PA (US);
Victor Stone, Pittsburgh, PA (US)

(73) Assignee: Fusao Ishii, Pittsburgh, PA (US)

( * ) Notice: Subject to any disclaimer, the term of this patent is extended or adjusted under 35 U.S.C. 154(b) by 145 days.

(21) Appl. No.: 17/463,511

(22) Filed: Aug. 31, 2021

(65) Prior Publication Data
US 2024/0236279 A1  Jul. 11, 2024

Related U.S. Application Data

(60) Provisional application No. 63/073,226, filed on Sep. 1, 2020.

(51) Int. Cl.
*H04N 9/31* (2006.01)

(52) U.S. Cl.
CPC .......... *H04N 9/3158* (2013.01); *H04N 9/3152* (2013.01); *H04N 9/3161* (2013.01)

(58) Field of Classification Search
CPC ... H04N 9/3158; H04N 9/3152; H04N 9/3161
USPC .......................................................... 353/31
See application file for complete search history.

(56) References Cited

U.S. PATENT DOCUMENTS

| | | | |
|---|---|---|---|
| 5,844,637 A * | 12/1998 | Katsumata | G02F 1/133528 349/8 |
| 8,388,138 B1 * | 3/2013 | Boothroyd | H04N 9/3167 359/464 |
| 2006/0044521 A1 * | 3/2006 | Vandorpe | G03B 21/005 353/33 |
| 2006/0044654 A1 * | 3/2006 | Vandorpe | G02B 27/145 359/834 |
| 2018/0192013 A1 * | 7/2018 | Kato | H04N 5/74 |
| 2021/0116797 A1 * | 4/2021 | Homma | G02B 27/149 |

* cited by examiner

*Primary Examiner* — Magda Cruz

(57) ABSTRACT

Optics for Projection Display are disclosed including 3 DMD panel system enabling a compact size operable with a white light source such as a UHP lamp or white LED.

1 Claim, 17 Drawing Sheets

The thicknesses of layers are substantially enlarged

OPTICS FOR PROJECTION DISPLAY

CROSS REFERENCE TO RELATED APPLICATIONS

This application is a Non-Provisional application which claims the Priority Date of previously filed Provisional Applications 63/073,226 filed on Sep. 1, 2020.

BACKGROUND OF THE INVENTION

1. Field of the Invention

This invention relates to a display system for projecting an image. More particularly, this invention relates to projection optics enabling a high brightness projection display using a compact 3 DMD (digital mirror device) panel system

2. Description of the Prior Art

The market of projection display keeps moving toward more brightness so that high quality images can be displayed even in a bright room. The market requires more brightness and smaller form factor for less cost. In order to overcome the limitations, there is a need to provide improved and innovative optical panel system that can projection images with two to three times of brightness with much smaller size and greatly reduced production cost such that the limitations and difficulties can be resolved.

Specifically, an example of conventional three panel micro-mirror projection system is shown in FIG. 16 and FIG. 17. For large optical output, the size of projection system is often as large as a large refrigerator including a cooling system. There is a need to reduce the size of the three-panel micro-mirror projection system. Therefore, to overcome the limitations this invention provides a new and improved projection system that has substantially smaller size.

SUMMARY OF THE INVENTION

In summary, this invention provides an optical apparatus for a color projector with three DMD. which provides 2 to 3 times brighter optical output than a conventional single DMD panel projector and 3 panel LCD projector for much less cost and smaller size. This invention is applicable to three LCOS projector too.

FIG. 1 shows the basic principle of this invention. White light (108) is inputted into a cross-prism (105) having dichroic mirrors (106 and 107) inside and the white light is split into 3 color beams and lead toward three DMDs (digital micromirror device). Then the three DMDs reflect the lights toward a projection lens (toward 109) and three beams are integrated into a single beam with the same dichroic mirrors. This arrangement makes the optical engine (101) substantially smaller than conventional optical engines shown in FIGS. 17 and 18, because a single cross-prism functions as both a splitter of light beam as well as an integrator. This system causes unwanted reflection by the wall of the prism. As an embodiment of this invention shows, these disadvantages can be eliminated with such as light shields and the arrangement of components.

Another aspect of this invention is unpolarized dichroic mirrors inside the prism. Cross prisms for polarized light are widely used for 3 panel transmissive LCD and LCOS (reflective), but such a prism often reduces the brightness, because the half of unpolarized light will not be utilized. Another example of this embodiment is to provide a dichroic cross prism for unpolarized light, which passes or reflects light regardless of the direction of polarization. This was achieved with three transparent but different refractive index materials not exceeding 40 layers.

Another type of exemplary embodiments include optical apparatus for creating white light beams having a very narrow divergent angle for this optical engine using polarizing prisms.

Another type of exemplary embodiments of this invention is to use a white LED which reduces the cost of projection optical engines.

Another type of exemplary embodiments of this invention include a TIR (total internal reflection) prism allowing vertical incident light even the mirror tilt angle is 45 degrees for higher contrast.

DETAIL EXPLANATION OF EMBODIMENTS

Figure 1:
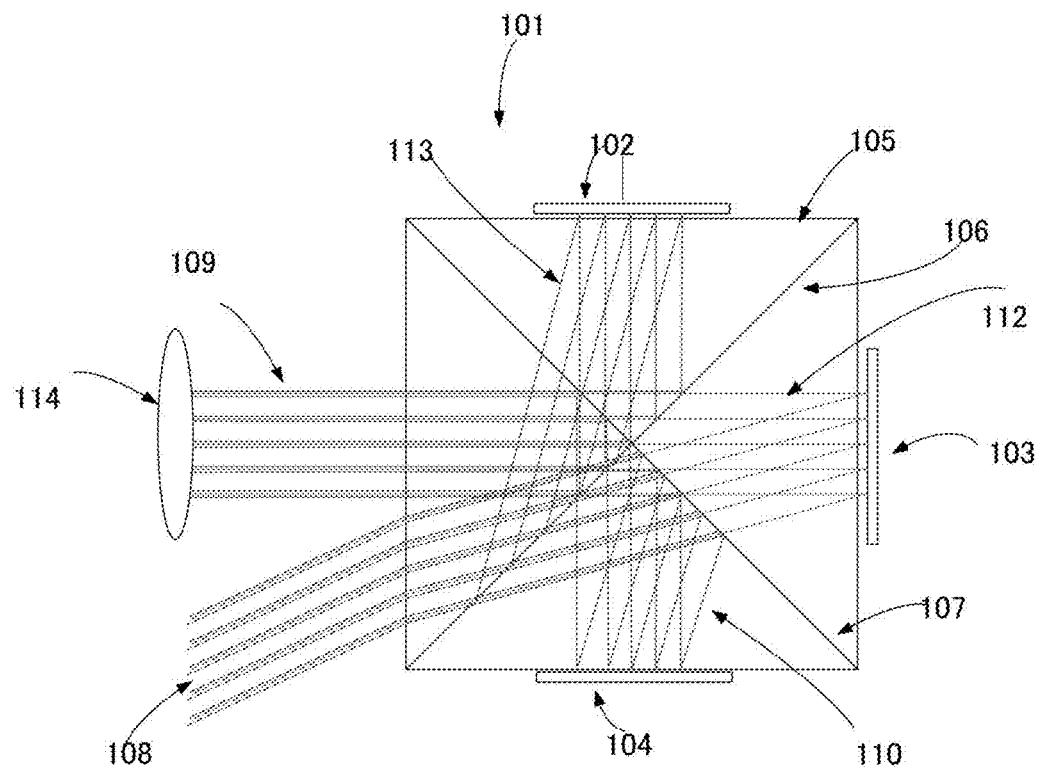
FIG. 1 shows the principle of compact 3 DMD panel system (101) using unpolarized light beams with unpolarized dichroic cross prism.
Figure 17:
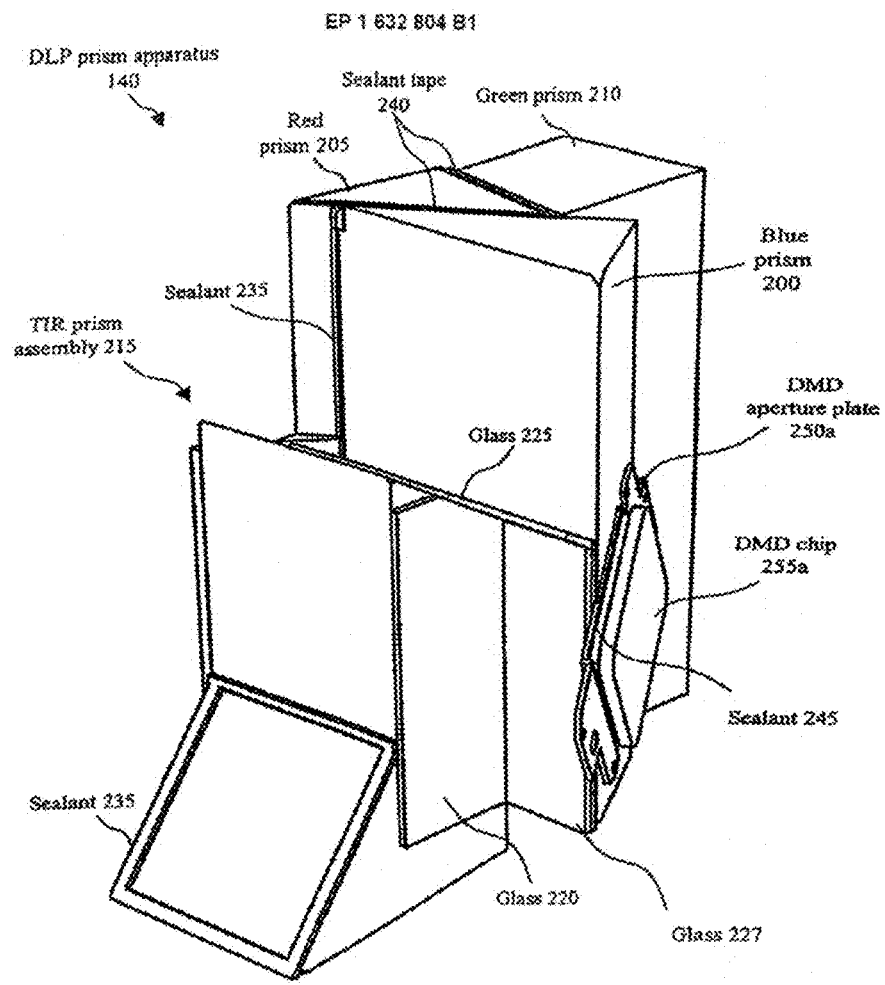
FIG. 17 shows a second conventional three panel micromirror projection system

In FIG. 1, an optical engine (101) exemplifies the principle of this invention. White incident light (108) is inputted into a cross-prism (X-prism, 105) which comprises two dichroic mirrors including a reflector (106) reflecting blue or shorter wavelength light and a reflector (107) reflecting red or longer wavelength light and are arranged inside of the prism in X shape (105). The white light beam is split into red (110), green (112) and blue (113) beams and lead to each of three DMDs (102, 103, 104) digital micromirror device (hereafter DMD) respectively. Each of DMDs reflects an image back to the same reflector which the incident light was reflected. The three-color images are integrated into a single image output (109) and lead to the projection lens (114) to focus the image on a screen. This optics can be made substantially smaller than the conventional optics such as FIG. 17, 18 examples.

Figure 2:
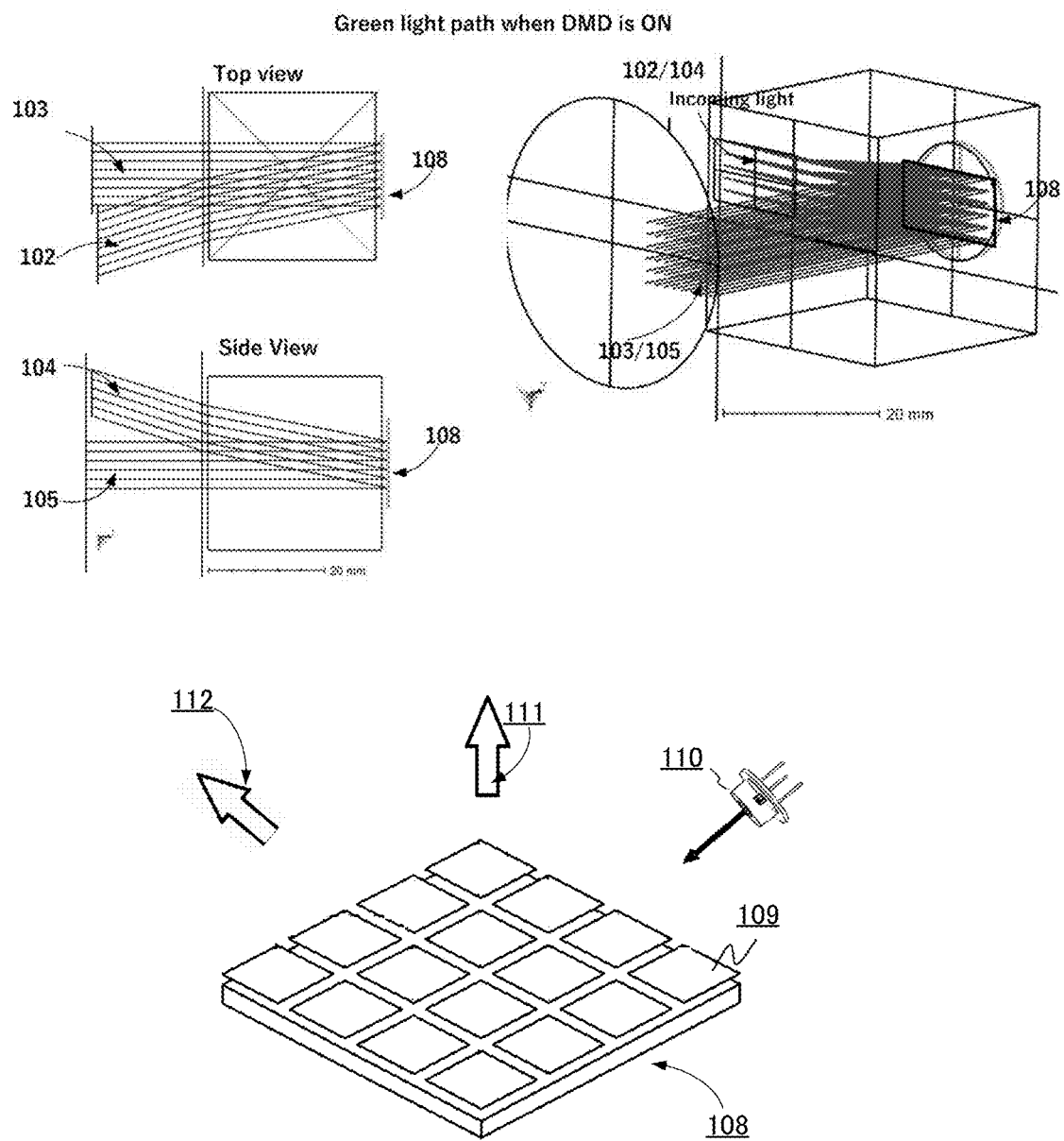
FIG. 2 shows simulation results illustrating the light beams reflected by the cross prism and DMDs where reflected light beams are aiming a projection lens for bright images.
Figure 3:
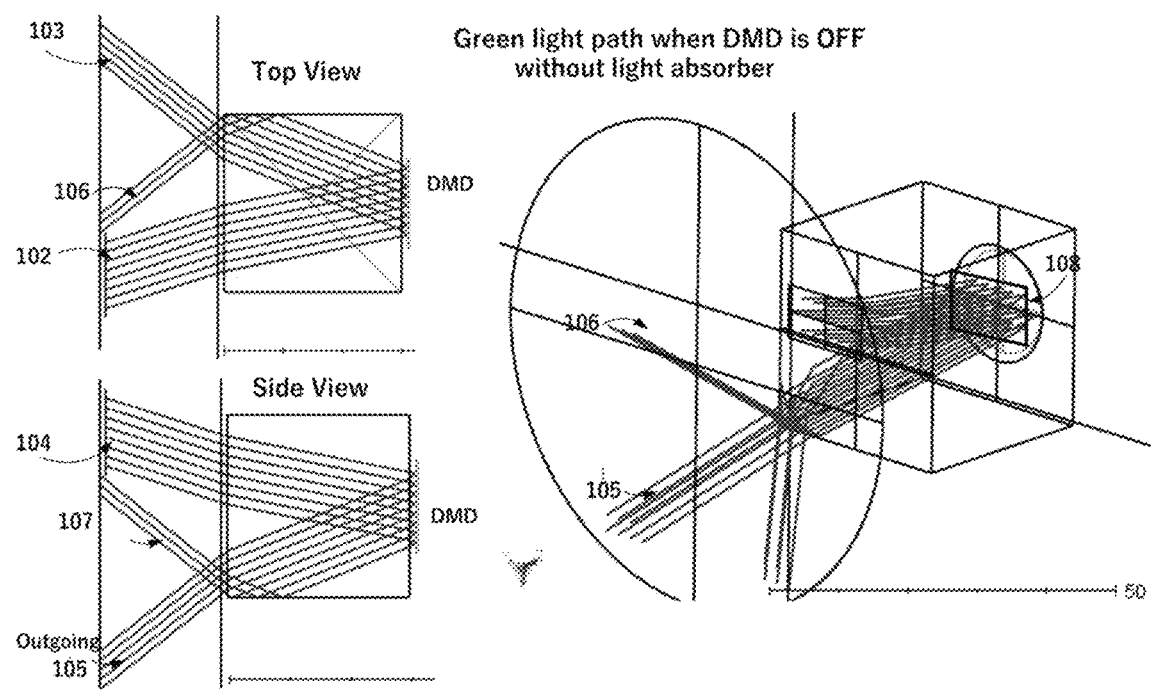
FIG. 3 shows another simulation where reflected light beams are aiming out of a projection lens so that the image is dark. This simulation indicates that unwanted reflection takes place.

In FIG. 2, the incident light beams (102-2 and 104-2) are lead to the inside of the X-prism. A unit can be as small as a book or a lightbulb. The light from bright pixels (103-2 and 105-2 in FIG. 2) at ON position of mirrors are reflected to the projection lens, but the light reflected from dark pixels at OFF position of mirrors (103-3 and 105-3 in FIG. 3) is reflected out of the projection lens area. Our simulation indicates it will hit the side wall of the prism and some of reflected light can be noise to the image (as 103-3 and 104-3 in FIG. 3). To prevent this problem, dark light absorbing coating can prevent unwanted light.

Figure 4:
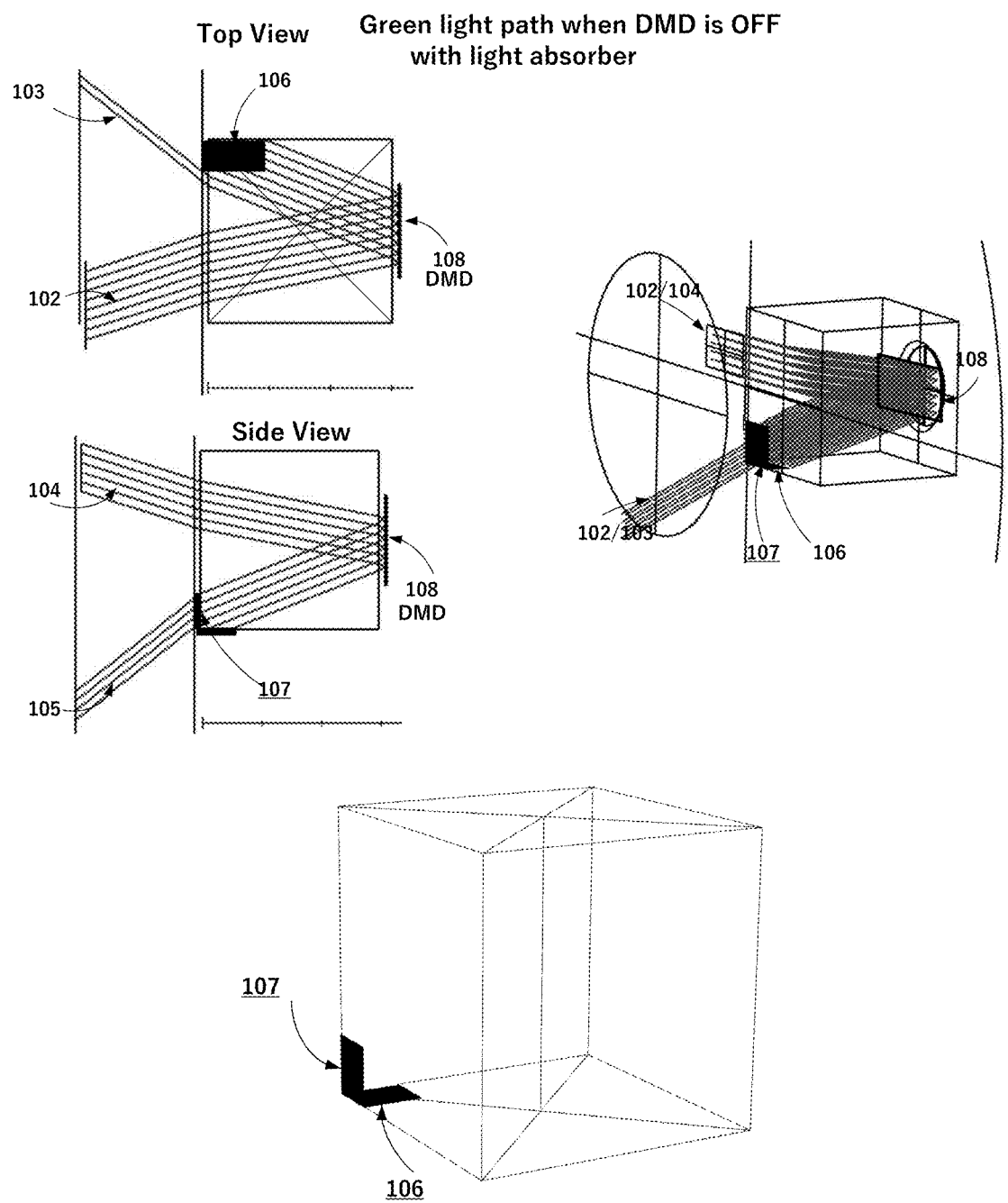
FIG. 4 shows another simulation with facets of the prism having an absorbing layer.

In FIG. 4, the incident beams (102-4 and 104-4) are introduced into the X-prism and reflected (103-4 and 105-4) by the DMDs at its OFF position. The majority of will go out of the X-prism, but some of them (106-4 and 107-4) are reflected by the facets of X-prism. As long as the reflected light will not get in the projection lens, it will not affect the contrast of an image. However, these reflected lights often get in a projection lens after multiple reflections. Therefore, the reflection by the facets should be minimized as much as possible.

Figure 5:
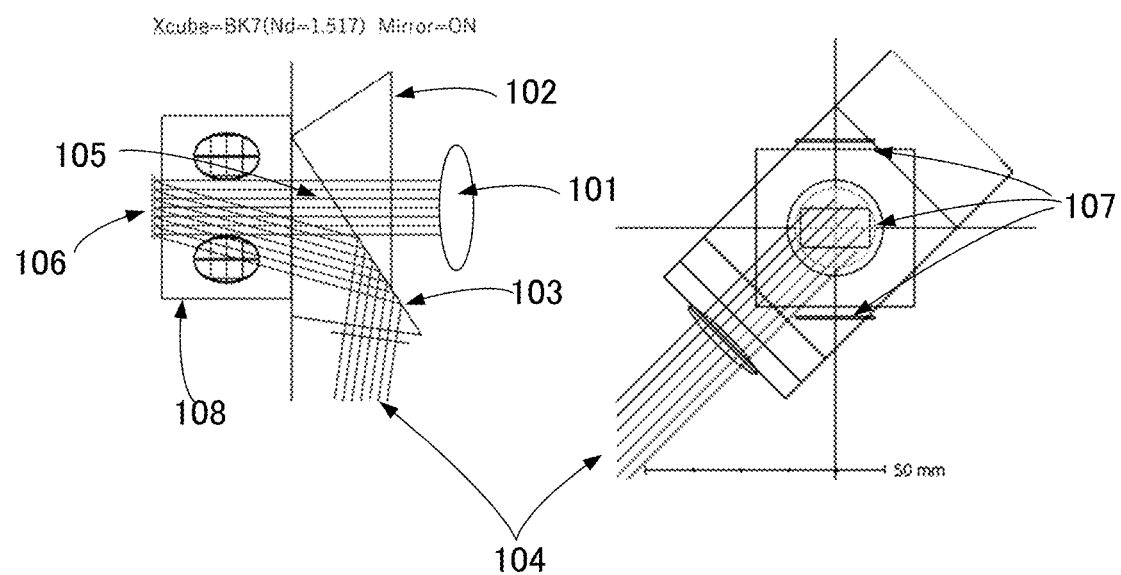
FIG. 5 shows an example of this invention using TIR prism to input an incident beam in 45 degrees angle, where the micromirror is in ON state.

In FIG. 5, another embodiment is shown. 104 is incident light beam and 101-5 is a projection lens. 106-5 and 107-5 are DMDs. On top of the X-prism (108-5), a TIR (total internal reflection) prism (105-5 comprising 102-5 and 103-5) is placed to reduce the optical path and the size of the system. The light paths are show when the mirrors are at ON position.

Figure 6:
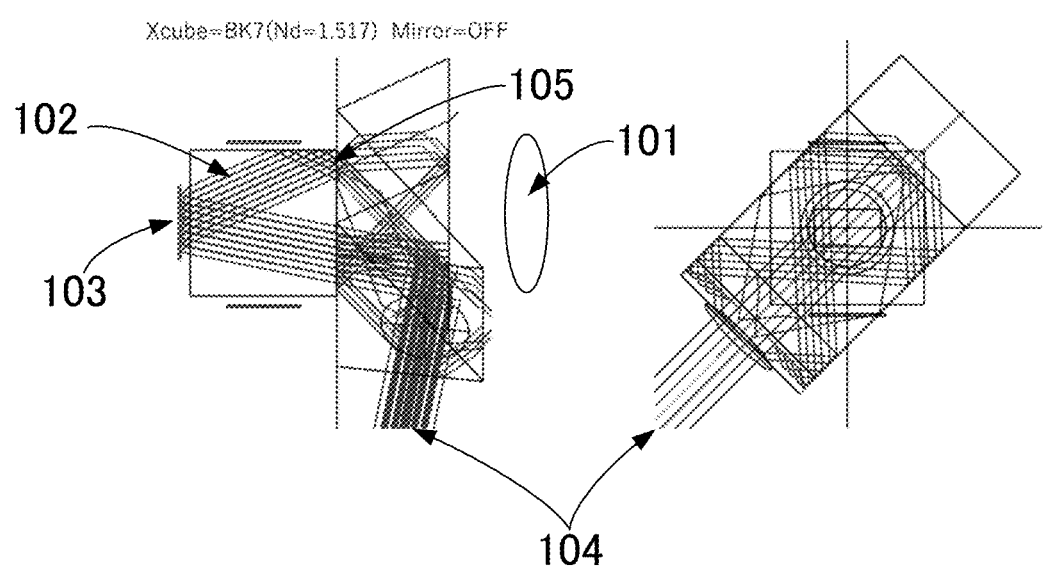
FIG. 6 shows an example of light paths using TIR prism to input an incident beam in 45 degrees angle, where the micromirror is in OFF state and the outgoing beams are reflected by the surfaces of the X-prism.
Figure 7:
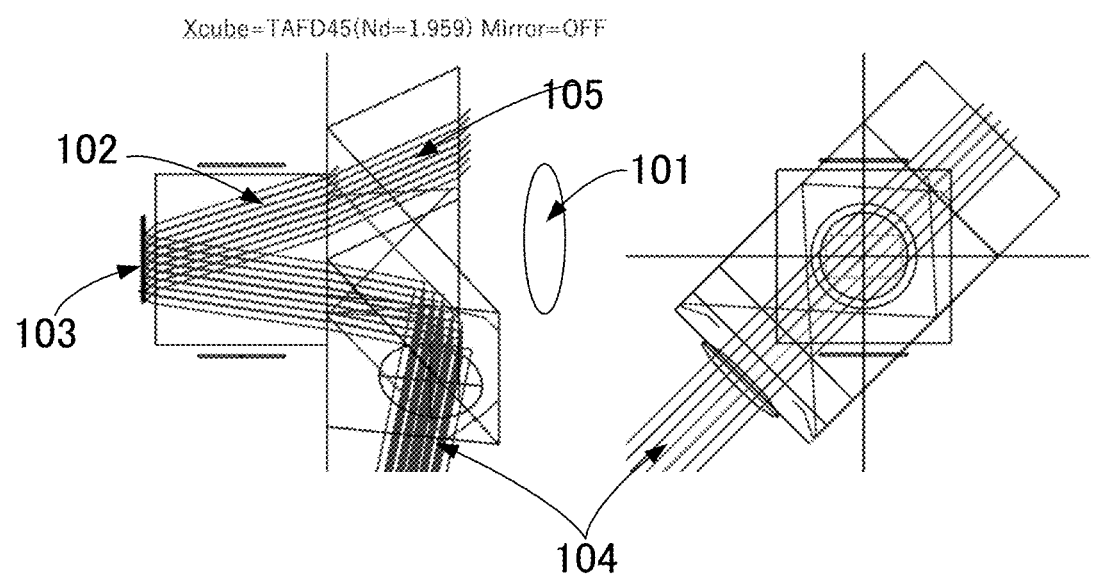
FIG. 7 shows an example of light paths using TIR prism to input an incident beam in 45 degrees angle, where the micromirror is in OFF state and the reflection of the outgoing beams is avoided.

In FIG. 6, the incident light is 104-6 and 103-6 is a DMD. A projection les is shown as 101-6. The lights reflected by the DMDs (103-6) are shown as 102-6. In FIG. 7, the incident light is 104-7 and 103-7 is a DMD. A projection les is shown as 101-7. The lights reflected by the DMDs (103-7) are shown as 102-7.

Figure 8:
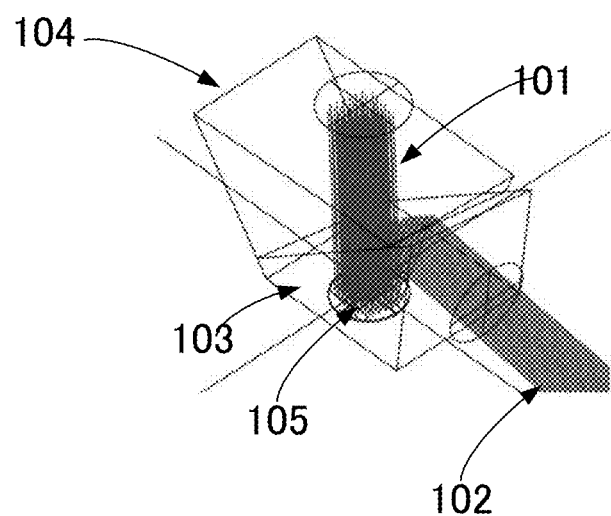
FIG. 8 shows an example of this invention using TIR prism to input an incident beam in vertical direction to the TIR, although the incident beam into the micromirror is 45 degrees.
Figure 9:
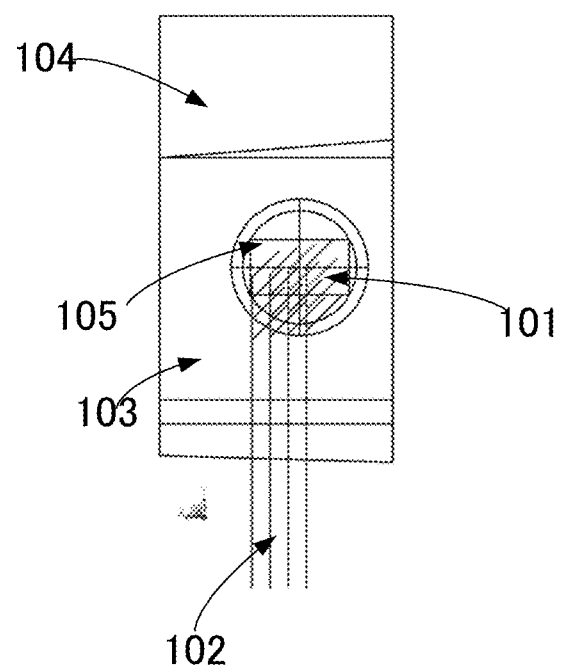
FIG. 9 shows the plain view of the sample in FIG. 9
Figure 10:
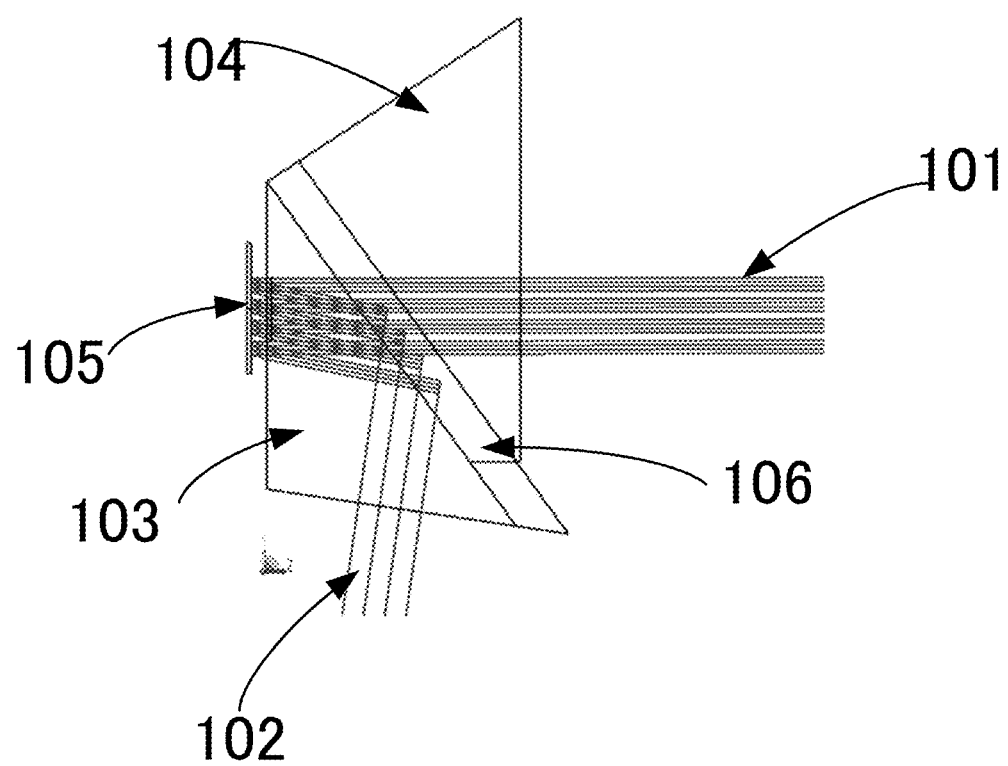
FIG. 10 shows the side view of the sample in FIG. 9

In FIG. 8, another example of this invention is shown. A DMD has the best contrast of image, when the mirrors are tilted at 45 degrees to the side of pixel array as shown in FIG. 5. However, this arrangement requires more space. The two prisms (FIG. 5, elements 103 and 104) are triangular prisms. The normal vectors of the surfaces forming the air gap between the two prisms are within Y-Z plane. If non-triangular prisms are used as shown in FIG. 8 and FIG. 9, the TIR prism and the cross prism can be arranged as parallel. This invention enables to combine 45 degree incident angle to a micromirror device and vertical (perpendicular) incident angle to TIR prism by introducing 3 dimensionally tilted air gap between two prisms of a TIR prism pair. As shown in FIG. 8, (FIG. 8, element 102) is an incident light beam. (FIG. 8, element 105) is a DMD panel. (FIG. 8, element 103) is the lower prism and (FIG. 8, element 104) is the upper prism of TIR. As shown in FIG. 8, (FIG. 8, element 101) is the outgoing light beam. FIG. 9 shows the plain view of FIG. 8 and FIG. 10 show the side view, where the DMD is (FIG. 9, element 101), the incident light is (FIG. 9, element 102) and (FIG. 9, element 103) is the lower prism and (FIG. 9, element 104) is the upper prism of TIR and (FIG. 9, element 106) is the 3D tilted air gap between (FIG. 9, elements 102 and 104). When the air gap surfaces are tilted in 3D, the prisms become non-triangular prisms.

Figure 11:
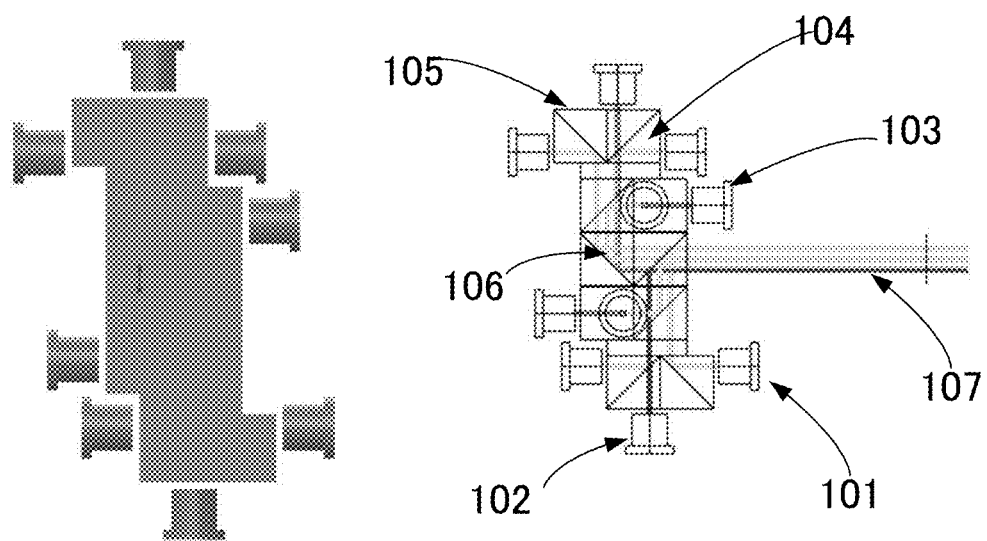
FIG. 11 show an example of a unit of building block of laser light sources. This unit can be added as many as needed to obtain enough brightness for a projection system.
Figure 12:
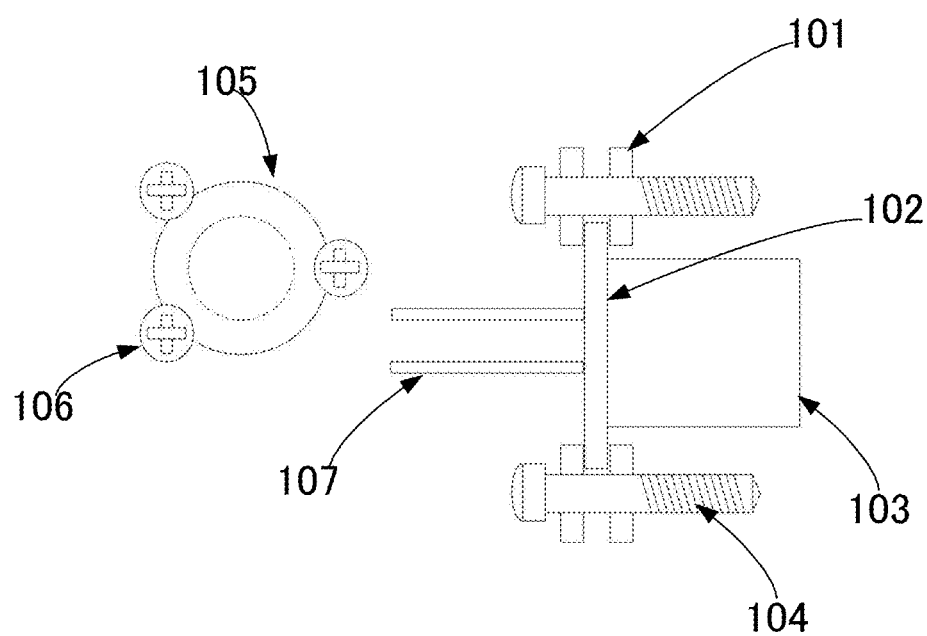
FIG. 12 shows an adjustment mechanism of laser positioning and directional control for the above light sources.
Figure 13:
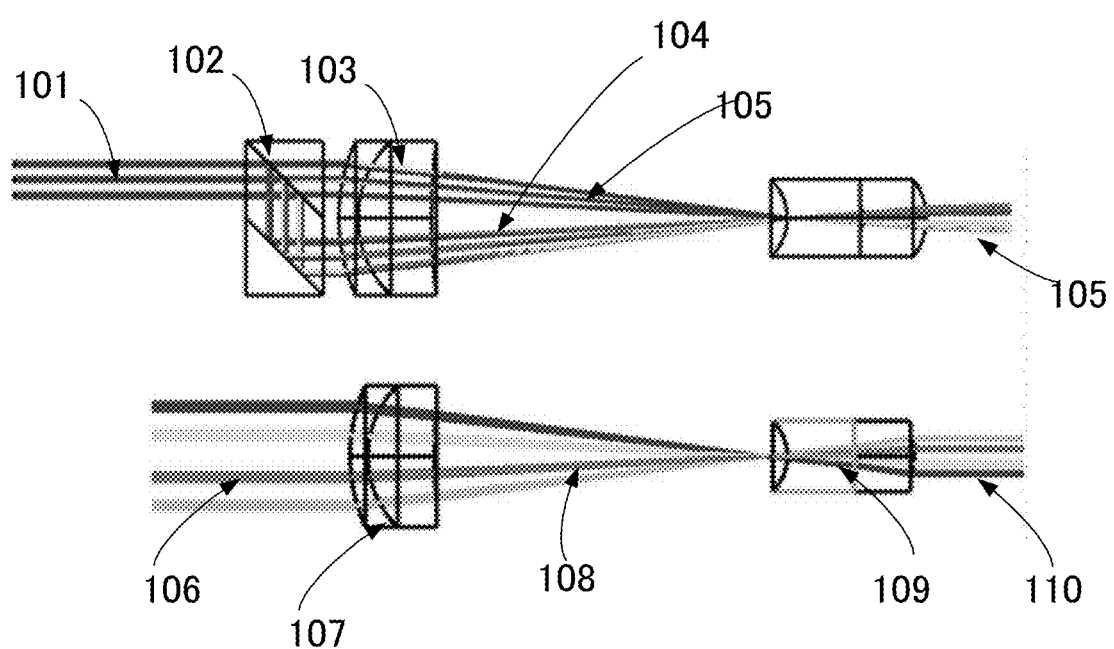
FIG. 13 shows another example of this invention to integrate the multiple building blocks to obtain a single narrow beam after integration.

Another example of embodiments is shown in FIG. 11 to FIG. 13. FIG. 11 shows an example of a laser light source providing white light (107-11) for a projection system which requires a white light beam as this 3 DMD panel system. A combiner of laser light source (combining multiple laser light beams into a single direction is shown in FIG. 11. Light beams from laser diodes (101-11, 102-11, 103-11 and other same shaped units) with different wavelengths can be combined into a single direction, but light beams with a same wavelength cannot be combined into a single direction, unless different polarization. FIG. 11 shows an example to combine three primary color laser beams and further combine same wavelength light beams using polarization. The system comprises of single type building blocks as shown in FIG. 11, where 104-11, 105-11 and 106-11 are PBS (polarized beam splitter) to reflect in 90 degrees or integrate two beams into a single beam. The intensity of light output can be increased as much as desired by adding the building block as many as needed. The wavelength cannot be changed without substantial loss of energy, but the direction of polarization can be changed with minimum loss of energy using a quarter lambda plate. For minor adjustment of laser beam direction, an example of adjustment mechanism is shown in FIG. 12, where 106-12 is a screw to adjust the direction of laser beam and 102-12 and 105-12 are a flange of container (103-12) of laser and 101-12 is a pair of rings to hold the flange.

FIG. 13 shows an example of polarizer without enlarging the size of beams, where 101-13 is a incident beam, 102-13 is a polarization converter (splitting S and P and convert S to P). 103-13 is achromatic lens and both 104-13 and 105-13 have a same polarization and a collimated light (111-13) is outputted. 106-13 is a single polarized light beam and the diameter of beam can be reduced if the etendue of light beam is small which is usually the case of laser beam. 107=13 is an achromatic lens 108-13 is a single polarized focusing beam and collimated by a collimation lens (109-13) and outputted as a single beam (110-13).

Figure 14:
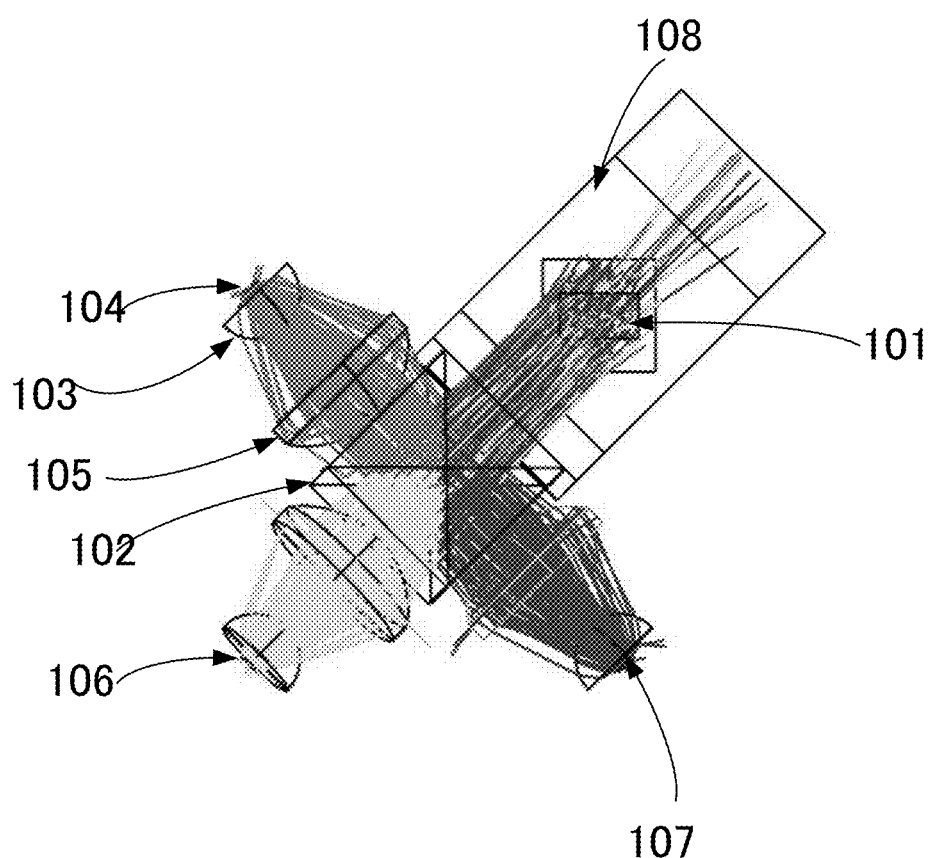
FIG. 14 shows a compact LED light source using unpolarized dichroic cross prism.

Another example of light source using LEDs is shown in FIG. 14 using a unpolarized dichroic cross prism (102-14) and a DMD (101-14) and a TIR prism (108-14) to integrate three LED (104-14, 106-14, 107-14) lights into a single beam using a object lens (103-14) and a collimation lens (105-14).

Figure 15:
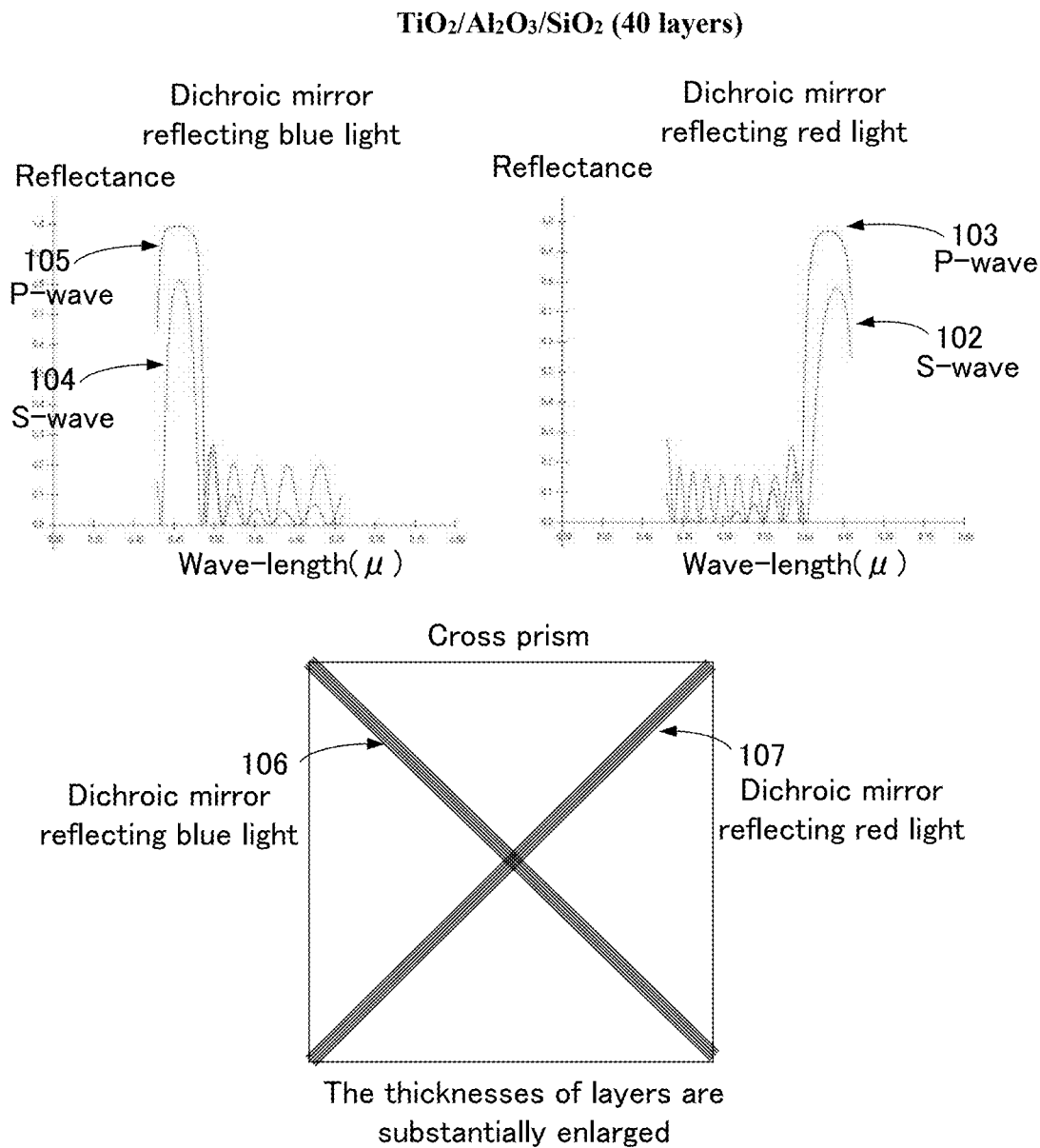
FIG. 15 shows an example of the spectrum distribution of reflected S-wave and P-wave lights by an unpolarized dichroic mirrors developed for this invention.
Figure 16:
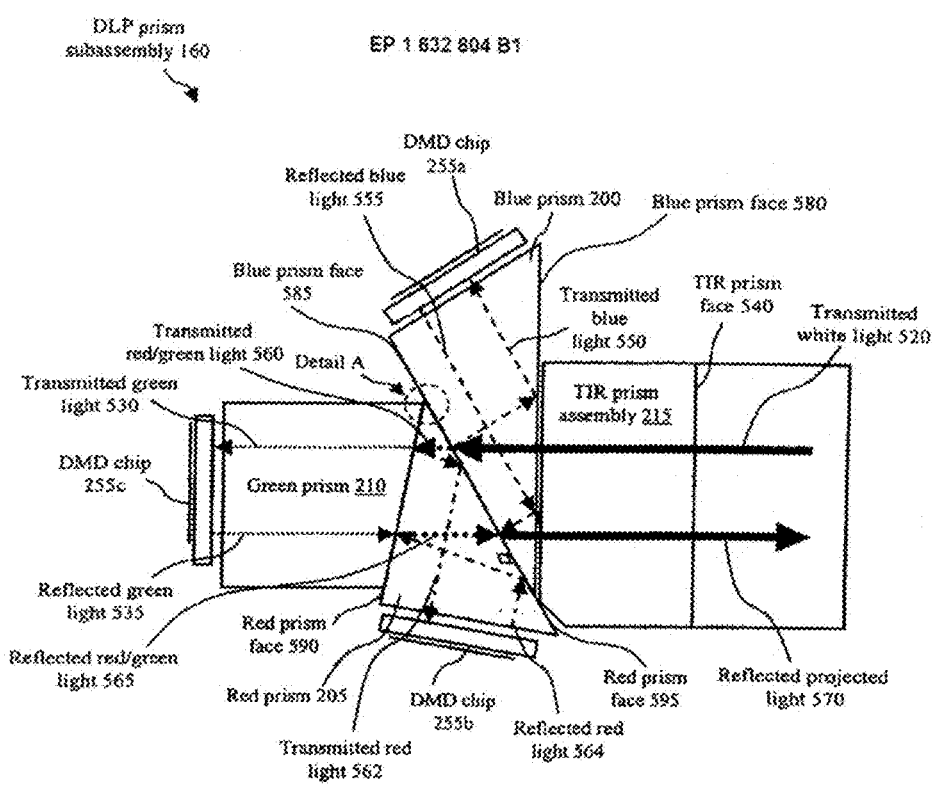
FIG. 16 shows a first conventional three panel micromirror projection system.

A cross prism for polarized light is widely used for 3 panel transmissive LCD and LCOS (reflective), but such a prism substantially reduces the brightness, because the half of unpolarized light may not be utilized. Another example of this embodiment is to provide a dichroic cross prism for unpolarized light minimizing the loss of light, which passes or reflects light regardless of the direction of polarization. FIG. 15 shows the reflectance vs. wavelength of a sample. Both S (102-15 and 104-15) and P (103-15 and 105-15) waves are reflected for desired wavelengths. The vertical axis is the reflectance of light, and the horizontal axis is wavelength in microns. This was achieved with three different but commonly used materials not exceeding 40 layers of thin films.

We claim:
1. An unpolarized dichroic cross prism comprising:
   four triangular prisms assembled to a cube including reflective layers having $TiO_2$, $Al_2O_3$ and $SiO_2$ with more than thirty layers and less than fifty layers.

* * * * *